United States Patent [19]

Cloutier

[11] Patent Number: 5,790,543
[45] Date of Patent: Aug. 4, 1998

[54] APPARATUS AND METHOD FOR CORRECTING JITTER IN DATA PACKETS

[75] Inventor: Leo Cloutier, Bethesda, Md.

[73] Assignee: Bell Atlantic Network Services, Inc., Arlington, Va.

[21] Appl. No.: 533,501

[22] Filed: Sep. 25, 1995

[51] Int. Cl.⁶ .............................. H04N 7/52; H04L 12/56
[52] U.S. Cl. ...................... 370/395; 370/517; 348/423
[58] Field of Search .............................. 370/474, 476, 370/395, 397, 503, 506, 508, 516, 517, 519, 471, 473, 472; 375/371, 372; 348/423, 474, 500, 432, 434, 497

[56] References Cited

U.S. PATENT DOCUMENTS

| | | |
|---|---|---|
| 4,716,575 | 12/1987 | Douros et al. . |
| 4,894,823 | 1/1990 | Adelmann et al. . |
| 4,984,264 | 1/1991 | Katsube . |
| 5,127,000 | 6/1992 | Henrion . |
| 5,153,578 | 10/1992 | Izawa et al. . |
| 5,229,998 | 7/1993 | Weisser . |
| 5,247,347 | 9/1993 | Litteral . |
| 5,247,464 | 9/1993 | Curtis . |
| 5,260,978 | 11/1993 | Fleischer et al. . |
| 5,285,446 | 2/1994 | Yonehara . |
| 5,381,181 | 1/1995 | Deiss . |
| 5,390,184 | 2/1995 | Morris . |
| 5,394,395 | 2/1995 | Nagai et al. . |
| 5,396,497 | 3/1995 | Veltman . |
| 5,452,010 | 9/1995 | Doornink .................. 370/517 |
| 5,467,432 | 11/1995 | Logston et al. .............. 370/395 |
| 5,473,385 | 12/1995 | Leske ........................ 348/500 |
| 5,533,021 | 7/1996 | Branstad et al. ............ 370/517 |
| 5,565,924 | 10/1996 | Haskell et al. ............. 370/516 |

FOREIGN PATENT DOCUMENTS

| | | |
|---|---|---|
| 3-114333(A) | 5/1991 | Japan . |
| 4-123549 | 4/1992 | Japan . |
| 4-207435 | 7/1992 | Japan . |
| 5-37560 | 2/1993 | Japan . |

*Primary Examiner*—Chau Nguyen
*Attorney, Agent, or Firm*—McDermott, Will & Emery

[57] ABSTRACT

An arrangement (apparatus and method) for detecting jitter caused during transport of digitally-coded information, such as MPEG-encoded data packets, and for correcting time stamp reference values in accordance with the detected jitter. The disclosed arrangement detects program clock reference (PCR) values from an MPEG-encoded transport stream, whereby each pair of PCR values represents an expected interarrival time of a corresponding stream segment. An actual interarrival time for the corresponding stream segment is determined in response to detection of the corresponding PCR values and an independent clock signal. The expected interarrival time of the stream segment is compared with the actual interarrival time in order to determine the jitter in the data packet stream. The jitter is corrected by a combination of adaptive buffering techniques and restamping the PCR value with corrected values coinciding with the actual interarrival time of the stream segments. The disclosed arrangement may be implemented in a receiver system, or as part of the network node that minimizes the effects of cell delay variation in an ATM network.

57 Claims, 7 Drawing Sheets

1

APPARATUS AND METHOD FOR CORRECTING JITTER IN DATA PACKETS

TECHNICAL FIELD

The present invention relates to devices used to correct timing errors created in the transport of compressed, digital information using Asynchronous Transfer Mode (ATM) technology.

BACKGROUND ART

There is a trend in the communications industries to develop digital systems that provide more efficient transmission of information. This development is found in digital cellular telephone systems, facsimile transmission systems, and video distribution systems. In particular, a number of systems have recently been proposed for distributing video information in compressed, digital data form.

Various wideband digital distribution networks have been proposed for offering subscribers an array of video services, including true Video On Demand Service. For example, U.S. Pat. No. 5,247,347 to Litteral et al., assigned in common with the present invention and incorporated herein in its entirety by reference, integrates a public switched telephone network with video-on-demand service. Specifically, a Digital Cross-connect System (DCS) receives compressed video data from a video provider and supplies the video data to selected central office (CO) interfaces. Electronic devices associated with the subscriber loops modify the transmission characteristics of the subscriber loops to permit delivery of full motion video information over existing loop plant facilities. Thus, the video signal from the video provider is supplied to the subscriber over the DCS, the CO interface and subscriber telephone local loop to the subscriber interface unit.

Such wideband distribution networks transport digitized, compressed video program information in order to improve transport efficiency. For example, MPEG (moving picture experts group) is a broad generic standard for digital video program compression. A number of specific compression algorithms satisfy MPEG requirements. MPEG-2 is a second generation compression standard capable of encoding video program material into a 6 Mbits/sec bit stream and packetizing a number of 6 Mbits/sec channel streams into a single higher rate signal transport stream.

At the subscriber premises, the digital compressed program stream transported by the wideband digital distribution networks must be recovered in order to provide the video information to video display systems for displaying the video information to the subscribers. Unlike a computer data file composed of data downloaded from a remote server for use in a local computer, such as a personal computer, video data, by definition, consists of "real-time" information. To insure accurate real-time reproduction for viewing requires synchronization of the encoding and decoding processes. Various MPEG receiver systems have been developed to synchronize MPEG decoders to a received MPEG-encoded stream. Basic MPEG receiver systems synchronize internal clocks to received time stamp values, known as Program Clock Reference (PCR) values, by sampling the PCR values, calculating the difference between the sampled PCR values and counted internal clock values (C) between PCR samples to obtain an error signal, and outputting an error signal to the internal clock to synchronize the internal clock according to the calculated difference.

U.S. Pat. No. 5,396,497 to Veltman discloses an MPEG I demultiplexer/decoder comprising a clock producing a time reference, and a demultiplexing switch separating a composite data stream into audio sample batches, audio time stamps, video frames, and video time stamps. The disclosed demultiplexer/decoder also comprises an audio phase locked loop, and a video phase locked loop, whereby the audio phase-locked loop produces an audio timing signal in response to the audio time stamps and time reference, and the video phase-locked loop produces a video timing signal in response to the video time stamps and the timing signal. The audio timing signal and the video timing signal are supplied to audio and video decoders, respectively. In addition, Veltman uses data packets in the MPEG I stream, referred to as a system clock reference (SCR), to control the transfer data rate in the decoder. The SCR is used during initialization of the device in order to synchronize the phase-locked loops with the respective data streams.

U.S. Pat. No. 5,381,181 to Deiss discloses a clock recovery apparatus for an MPEG I decoded signal. According to Deiss, the receiver comprises a counter responsive to a controlled receiver clock signal, whereby the counter is sampled at the arrival of a count value embedded in the MPEG transport layer. The differences of successive sampled count values from the receiver counter are compared with the differences of corresponding successive values of the MPEG count value in the MPEG transport layer to provide a signal to control the receiver clock signal.

FIG. 1 is a simplified block diagram of the clock recovery apparatus disclosed in Deiss. As shown in FIG. 1, the clock recovery apparatus comprises a PCR detector 10 that receives a MPEG I-encoded data stream. The MPEG stream comprises count values, denoted program clock references (PCR), embedded as auxiliary data within the transport packets. As disclosed in Deiss, these PCRs are supplied during encoding of the video signal as presentation time stamps in order to provide lip synchronization of associated audio and video information at the receiver.

Referring to FIG. 1, the PCR detector 10 produces a control pulse 10a to a counter 12 upon the detection of a PCR value in the data stream. The counter 12 is driven by a voltage controlled oscillator (VCXO) 14. Upon receiving the control pulse 10a, the counter 12 outputs the count value to a subtraction circuit 16, and resets itself to restart counting modulo $2^{30}$ in response to the count pulses from the VCXO 14. The subtractor 16 calculates an error signal (E) in response to the differences between the detected PCR values from the MPEG stream and the counted values (L) latched from the counter 12. Thus, according to Deiss, the error signal E is calculated by the subtractor 16 according to the following equation:

$$E = |PCR_n - PCR_{n-1}| - |L_n - L_{n-1}|$$

The calculated error signal E is passed through a low pass filter 18 and then applied to the VCXO 14, designed to operate substantially at 27 MHz. The error signal E is utilized to condition the voltage controlled oscillator 14 to a frequency tending to equalize the differences between the counted values output by the counter 12 and the detected PCR values from the MPEG stream to enable the MPEG stream to be decoded by the MPEG decoder 20. Thus, Deiss contemplates adjusting the system clock to synchronize with the detected PCR stream.

As disclosed in Deiss, the digital video signal transmission arrangement generates presentation time stamps (PTRs) in response to a fixed frequency 27 MHz clock in the encoder. In addition, the receiver system of Deiss is intended to perform the inverse function of the encoder and transmitting modem at the transmitting headend. As such, Deiss assumes that there is no differential delay in the transport of the MPEG encoded stream, such that the detected PCR values at the receiver end represent an interarrival time corresponding to the interdeparture time defined by the system clock at the encoder.

However, attempts to improve the core switching, multiplexing and transmission technologies in integrated digital networks for transport of voice, data and video services from video information providers (VIPs) to multiple users may cause differential delays in the transport of the compressed digital data. For example, asynchronous transfer mode (ATM) has been developed as a technique to provide broadbandwidth, low delay, packet switching and multiplexing. In ATM, usable capacity can be assigned dynamically (on demand) by allocating bandwidth capacity to fixed-sized information-bearing units called "cells". Each cell contains header and information fields. The ATM standard, CCITT.121/2 specifies a 53 byte cell which includes a 5 byte header and a 48 byte payload.

The conversion of MPEG-2 data into ATM cell format, however, may impose differential timing delays due to the transport of the ATM cells throughout the network. The "asynchronous" nature of ATM causes timing problems in reception and reproduction of certain types of broadband information. Further, certain transmission protocols may require a stream of continuous data. Thus, an ATM data stream carrying MPEG video data may need to be padded with ATM idle cells, or "dummy cells", in order to ensure proper synchronization with the physical layer. Adding such idle cells may create delays between the ATM cells carrying the respective PCR values of the MPEG stream. Moreover, delays in the ATM cell stream are introduced each time an ATM cell stream passes through an ATM switch. Finally, different ATM cell streams may be multiplexed together to improve transport efficiency in the broadband network. For example, commonly-assigned, copending application Ser. No. 08/380,744, filed Jan. 31, 1995, entitled "Full Service Network Using Asynchronous Transfer Mode Multiplexing" (attorney ref: 680-109), the disclosure which is incorporated in its entirety by reference, discloses an ATM edge device which is used to multiplex a plurality of ATM cells from different input sources onto a reduced number of output paths by combining the cell streams from the different sources.

The delay imposed by each of these different ATM processes varies over time, for example as a function of the data rates of input cells and resultant loading on each ATM processing device. For such reasons, the delay imposed on one cell in a particular stream may vary with respect to the next cell in the same stream.

Thus, an ATM cell stream passing through different ATM network components undergoes cell delay variation, whereby the cell transport rate at a receiving end is different than the cell transport rate at the transmitting end. In other words, ATM transport of MPEG-encoded information causes a variation in the interarrival time between the MPEG packets carried by the ATM cells. The cell delay variation may create a delay on the order of one millisecond. Thus, the synchronous payload data within the received ATM cell stream may not have the same data rate as originally output at the transmitting end before conversion to an ATM cell stream. As such, the reconstructed MPEG stream at a receiving end may have PCR values that do not accurately reflect the interarrival time for the MPEG stream segment due to the differential delay caused by the cell delay variation. Thus, the MPEG stream effectively suffers from jitter due to the cell delay variation caused during transport through an ATM network.

As discussed above, the prior art receiver systems assume no differential delay in the PCR values stored in the MPEG stream and assure a uniform, constant delay between data packets. Thus, these prior art systems would be unable to compensate for jitter in the received MPEG stream. Moreover, the jitter in the received MPEG stream may cause a miscalculation in the error signal (E) supplied to the VCXO 14, resulting in a loss of synchronization. Thus, any jitter in a received MPEG stream would result in a degradation in receiver performance.

Disclosure of the Invention

In view of the foregoing, there is a need for an arrangement (apparatus and method) for measuring jitter in a transport stream of digitally compressed data packets carrying time stamp values at regular intervals, such as MPEG-encoded data packets carrying PCR values.

There is also a need for an arrangement (apparatus and method) for minimizing jitter caused during transmission of a data packet stream.

There is also a need for an arrangement (apparatus and method) for recovering timing in an MPEG stream that has suffered from cell delay variation during transport through an asynchronous transfer mode (ATM) network.

There is also a need for a broadband receiver adapted to receive ATM cells from a switched broadband ATM network, whereby the received ATM cells carry synchronous data. For example, there is a need for a broadband receiver that can reconstruct and resynchronize synchronous data that has undergone cell delay variation during transport through the ATM network.

There is also a need for a digital entertainment terminal (DET) able to recover an MPEG-encoded data stream from an ATM network, whereby the digital entertainment terminal compensates for jitter in the MPEG-encoded data stream.

There is also a need for a converter for converting a data stream of ATM cells carrying MPEG-encoded data into an MPEG-encoded packet stream having a cell delay variation module to correct for jitter in the MPEG-encoded packet stream. Such a converter may be implemented, for example, in an ATM demultiplexer for receiving a plurality of ATM cell streams and outputting a plurality of recovered MPEG packet streams having corrected PCR values.

These and other needs are met by the present invention, in which an arrangement is disclosed for measuring and minimizing jitter in a transport stream of digitally-compressed data packets that include time stamp reference values at regular interval portions within the data stream. The detected jitter, which may be caused during transport in an asynchronous network, can be minimized and corrected to provide a data packet stream having correct time stamp values relative to the corresponding data packet stream. The disclosed arrangement can be implemented in a receiver system such as a broadband receiver or digital entertainment terminal at a customer premises site, or may be implemented in a network arrangement as a demultiplexer node or a packet converter that corrects for jitter during the demultiplexing process.

According to the present invention, a method for measuring jitter in a transport stream of digitally-compressed data packets, such as MPEG-encoded data packets, includes the steps of detecting time stamp values such as program clock reference (PCR) values from the transport stream, each pair of time stamps representing an expected interarrival time of a corresponding data packet stream segment. An actual interarrival time for the corresponding data packet stream segment is determined in response to an independent clock signal. The expected interarrival time of the data packet stream segment is compared with the corresponding actual interarrival time to detect the jitter in the data packet stream segment from the data packet stream. The detected jitter can be applied to a data packet stream correction circuit to output the received data packet stream as a corrected data packet stream having time stamps substantially coinciding with the actual time duration of the corresponding data packet stream segment of the corrected data packet stream.

According to the present invention, the actual interarrival time for the corresponding data packet stream segment is determined independent from the detected time stamp values located within the data packet stream. Specifically, the prior art measured interarrival time by counting pulses from a voltage controlled oscillator having a data rate controlled by the received time stamp values. The present invention, however, measures the actual interarrival time using a time clock source that is independent from the data transport streams received from the network, and as such is unaffected by any jitter or cell delay variation that may influence the transport of a data packet stream. As a result, the independent clock source does not suffer any synchronization problems due to any jitter or cell delay variation that may be present in a received data packet stream. Thus, the present invention is able to detect any jitter which may be created during transport, for example, cell delay variation generated during transport in an asynchronous transfer mode (ATM) network. Moreover, the detected jitter may be corrected by modifying the data packet stream to have time stamps that correctly identify the expected interarrival time and the actual time duration of the corresponding data packet stream segment. For example, the detected jitter may be corrected by restamping the PCR fields of MPEG packets with corrected PCR values that compensates for the jitter. Alternatively, the detected jitter may be corrected using buffering techniques, such as modifying the spacing between data packets exiting the buffer, or modifying the output data rate of the buffered packet stream to compensate for the detected jitter.

The present invention is particularly advantageous in correcting jitter at the time that a data packet stream carrying time stamp values is reassembled after transport through an asynchronous network. In the case of ATM networks, the present invention minimizes the effects of cell delay variation. For example, the present invention may be implemented as an ATM-format to MPEG-format converter, also referred to as a cell delay variation module (CDVM), that outputs an MPEG stream after correcting for cell delay variation generated during transport through the network. The invention may be implemented as a network device, such as an ATM demultiplexer, that converts a plurality of ATM cell streams to MPEG data packets before transmission to a local loop distribution network. Alternatively, the invention may be implemented as a timing correction node in an ATM network, whereby a corrected MPEG stream is retransmitted in ATM cells.

The present invention may also be implemented as a broadband receiver that receives ATM cells from an ATM network, such as fiber to the curb or fiber to the home. The present invention may be particularly effective in correcting MPEG packet streams received at a subscriber premises, and may be used as a correction device that outputs the corrected MPEG stream to a digital entertainment terminal. Alternatively, the present invention may be implemented as an MPEG stream alignment circuit within the digital entertainment terminal itself.

Thus, the present invention ensures reliable reception, synchronization and decoding of a data packet stream by minimizing jitter caused during transport of the data packet stream. These and other advantages of the present invention will become more readily apparent upon a review of the following detailed description and the attached claims.

BRIEF DESCRIPTION OF DRAWINGS

Reference is made to the attached drawings, wherein elements having the same reference numeral designations represent like elements throughout, and wherein.

BEST MODE FOR CARRYING OUT THE INVENTION

The present invention is adapted to provide detection and correction of jitter in a stream of data packets that includes time stamp values at regular intervals representing the expected interarrival time of the respective segments of the data packet stream. A description will first be provided of an exemplary encoding system at a video headend that outputs a data stream to a distribution network, followed by a preferred implementation of the invention for minimizing jitter created during transport through the distribution network. A description of the various applications of the invention will thereafter be provided.

The present invention is directed to the correction of jitter created during transport of data packets through a broadband distribution network. As recognized in the art, the term jitter refers to time deviations or delays in the actual data rate of a received data packet compared to the expected data rate. The time deviations are typically created during switching and multiplexing operations in the broadband transport network. Thus, the data rate of a packet stream after transport on the broadband distribution network is different than the original data rate of the packet stream before transport. Such time deviations are present in networks using asynchronous transport mode (ATM) technology, and in such networks the time deviations are referred to as cell delay variations.

Examples of ATM transmission techniques are disclosed in commonly-assigned, application Ser. No. 08/250,792, filed May 27, 1994, entitled FULL SERVICE NETWORK, now U.S. Pat. No. 5,608,447, and the commonly-assigned, application Ser. No. 08/370,744, filed Jan. 31, 1995, entitled FULL SERVICE NETWORK USING ASYNCHRONOUS TRANSFER MODE MULTIPLEXING, now U.S. Pat. No. 5,470,425, the disclosures of which are incorporated in their entirety herein by reference. The apparatus disclosed in these identified applications use ATM processing for transport of video information, including broadcast video information.

Figure 1:
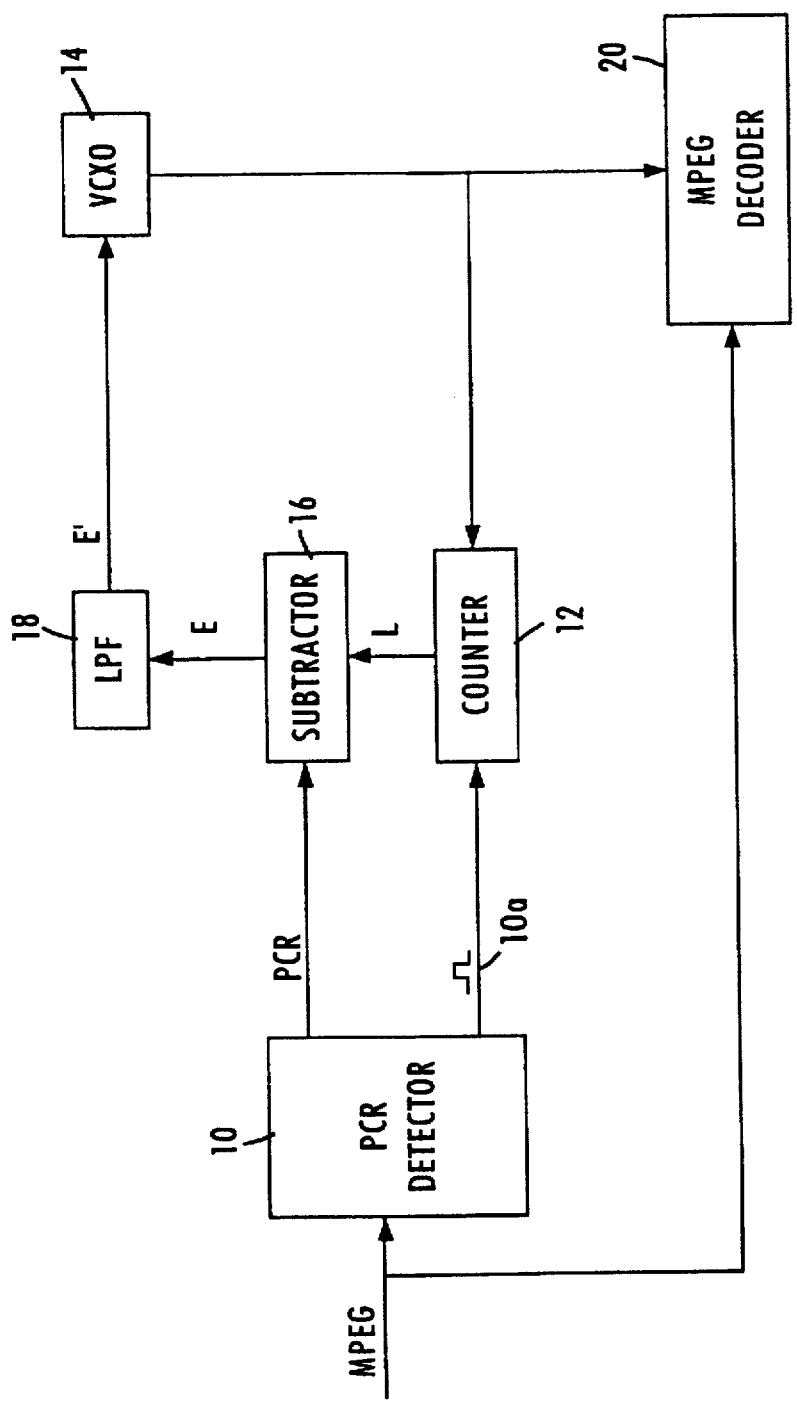
FIG. 1 is a simplified block diagram of a prior art MPEG receiver system.
Figure 7:
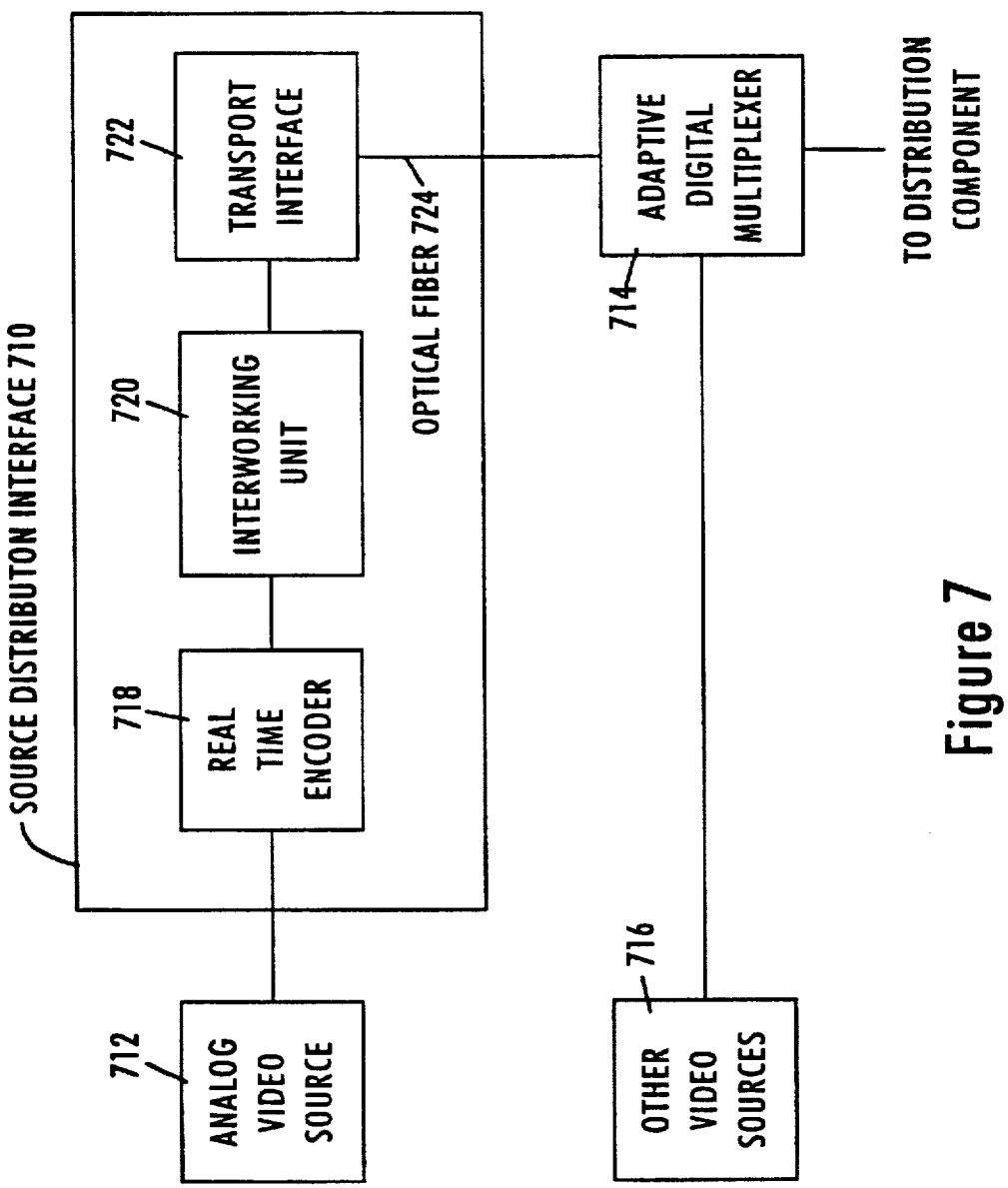
FIG. 7 is a block diagram of an encoding system at a video headend that outputs an ATM cell stream carrying encoded data packets to a broadband distribution system.

FIG. 7 corresponds to FIG. 1 of the identified application Ser. No. 08/370,744. FIG. 7 discloses a source distribution interface 710 that generates MPEG-2 streams carrying information from a baseband analog video source 712 to an adaptive digital multiplexer 714 that monitors ATM streams to be supplied to a distribution network. The adaptive digital multiplexer 714 may also receive an ATM stream from a second video source 716. The source distribution interface 710 includes a real time encoder 718 which digitizes and compresses in MPEG-2 format the audio and video signals from the baseband analog video source 712. The real time encoder 718 processes six sets of analog audio/video program signals in parallel, adds program clock references (PCR) to each MPEG-2 bit stream, and outputs six 6 Mbit/s MPEG-2 bit streams as a single 44.736 Mbit/s DS-3 signal to an interworking unit 720.

The interworking unit 720 prepares the MPEG-2 bit streams for ATM cell stream transmission over optical fiber transport links. For example, the interworking unit 720 will divide the bit stream into segments of appropriate length payloads and combine the payloads with ATM headers to obtain an ATM cell stream. The ATM cell stream is supplied to a transport interface 722, which converts the ATM cell stream to optical signals for transmission to the adaptive digital multiplexer via an optical fiber using, for example, an optical fiber transmission standard such as OC-12.

The adaptive digital multiplexer 714 determines whether the entire OC-12 channel capacity of the optical fiber is being utilized. If the optical fiber 724 is not being utilized at capacity, then the adaptive digital multiplexer 714 permits the second video source 716 to use the transport capacity not used by the first broadcast source 712.

The MPEG-2 standard, recognized in the art, provides a standardized syntax and format for packetizing the compressed audio and video information and for transporting other data. Under the MPEG-2 standard, incoming individual video signals and related audio signals are encoded and packetized into respective Video and Audio Packetized Elementary Streams (PES). The video and audio PES's from one or more sources of video programming may be combined into a transport stream for transmission or storage.

Each frame of compressed program information (audio, video or data) is broken down into a series of transport packets. Although compressed video frames can vary in size, the transport packets have a fixed 188 byte size. Thus, different frames are broken down into different numbers of MPEG transport packets. For example, for a 6 Mbits/sec encoding system, a group of frames consisting of a total of 15 frames for one-half second of video breaks down into approximately 2000 transport packets (or 4000 packets per second).

Transport stream packets consist of two sections, a 4 byte header section, an optional adaptation field and a payload section. The header information includes a synchronization byte, a variety of different flags used in reconstruction of the video frames, and a thirteen bit program identification (PID) number. PID value 0 is reserved as an indication that the packet includes program association table data. PID value 1 is reserved for identification of packets containing conditional access data, such as encryption information. Other program identification numbers are utilized to identify transport packets with the program source from which they originate.

Periodically, the transport packet for each program will also include a program clock reference (PCR) value within the optional adaptation field. For example, the PCR may be present in only 10 out of every 4000 video transport packets.

Thus, the encoder 718 compresses up to six NTSC analog audio/video program signals in parallel into an MPEG-2 format. The resulting six MPEG-2 packet streams with the appropriate overhead information are combined into a single MPEG-2 stream at 45 Mbits/sec (DS-3).

The DS-3 transport stream is output from the encoder 718 and supplied to an ATM interworking unit 720 which converts the MPEG-2 packets for the six programs into a single ATM cell stream containing all six programs at the DS-3 rate. Asynchronous transfer mode or "ATM" transport is an advanced, high-speed packet switching technology. In ATM, information is organized into cells having a fixed length and format. Each cell includes a header, primarily for identifying cells relating to the same virtual connection, and an information field or "payload". Specifically, a 53 byte ATM cell includes a cell header consisting of 5 bytes and a payload consisting of 48 bytes of payload data. The ATM cell header information includes a virtual path identifier/virtual circuit identifier (VPI/VCI) to identify the particular communication each cell relates to.

In ATM, transfer is asynchronous in the sense that the recurrence of cells that contain information from any particular sender is not necessarily periodic. Each device using the ATM network submits a cell for transfer when they have a cell to send, not when they have an assigned or available transmission time slot. However, the ATM cells may ride in synchronous slots on a high-speed time division multiplexed media, such as a SONET optical fiber. ATM allows any arbitrary information transfer rate up to the maximum supported by the ATM network, simply by transmitting cells more often as more capacity is needed.

Thus, the interworking unit 720 converts the MPEG-2 bit streams into cellular payload data, adds cell headers, and outputs the ATM stream. In other words, the interworking unit 720 breaks out the individual programs into cell payloads and adds header information (including VPI/VCI) to map the programs into ATM virtual circuits in the corresponding output cell stream. As noted above, each MPEG packet consists of 188 bytes, whereas each ATM cell includes 48 bytes of payload data. The preferred mapping scheme uses two different adaptations. The first adaptation maps two 188 byte MPEG packets into eight ATM 48 byte cells payloads. The second adaptation maps one 188 byte MPEG packet into five ATM 48 byte cell payloads.

MPEG packets of 188 bytes map efficiently into ATM cells if pairs of packets are mapped into 8 cells. However, a delay is imposed on mapping of a first cell while waiting for the second cell in the pair. To minimize jitter at the decoder, the packets carrying the PCR need to be encoded and transported quickly. To avoid delaying first packets containing a PCR while processing a second packet, the multiplexer 714 maps first packets containing a PCR immediately, using the five cell adaptation procedure. As noted above, the PCR is typically present in 10 or more out of every 4000 packets. Also, at least some of those likely will arrive as the second packet of a pair. Typically, 20 PCR values are sent in one second. Consequently, only a very small number of packets are mapped using the less efficient 5-cell adaptation.

As noted above, each cell of a particular stream will have a header which contains a virtual path identifier/virtual circuit identifier (VPI/VCI) to identify the virtual circuit that the cells pertain to. All MPEG packets for a given program, whether video, audio or data, will be mapped into ATM cells having the same VPI/VCI. Conversely, cells having a given VPI/VCI will contain data corresponding to only one identified program. Thus, each ATM cell carrying video information for a specified program from a video information provider can be identified on the basis of its corresponding VPI/vCI.

The transmission of ATM cells in an asynchronous DS-3 signal may require a common clock reference in order to ensure frame alignment in the network. Thus, the six MPEG-2 channels in ATM cell format are supplied to the network in accordance with a physical layer convergence protocol (PLCP). The PLCP is a framing structure used to ensure that ATM cells are aligned with respect to a corresponding video frame, even though there may exist drifting of a start and end of a typical DS-3 frame. Specifically, the PLCP references a DS-3 header and identifies the location of each ATM cell with respect to the DS-3 header. Since the DS-3 frame contains a maximum of twelve ATM cells, the PLCP notes the location of each of the cells 1–12 with respect to the DS-3 header. Therefore, even though there may be DS-3 frame drifting, the PLCP ensures alignment, from a cell perspective, between the cell layer and the DS-3 frame so that each of the twelve ATM cells within each DS-3 frame can be located.

The ATM multiplexing operation by the adaptive digital multiplexer 714, as well as other multiplexing and switching operations in the ATM distribution network, may introduce cell delay variation in the ATM cell streams transported throughout the ATM network. Hence, upon reassembling the MPEG-2 packet stream from the ATM cells, the original six 6 Mbit/s MPEG-2 bit streams may have variations in the original 6 Mbit/s data rate.

Figure 2:
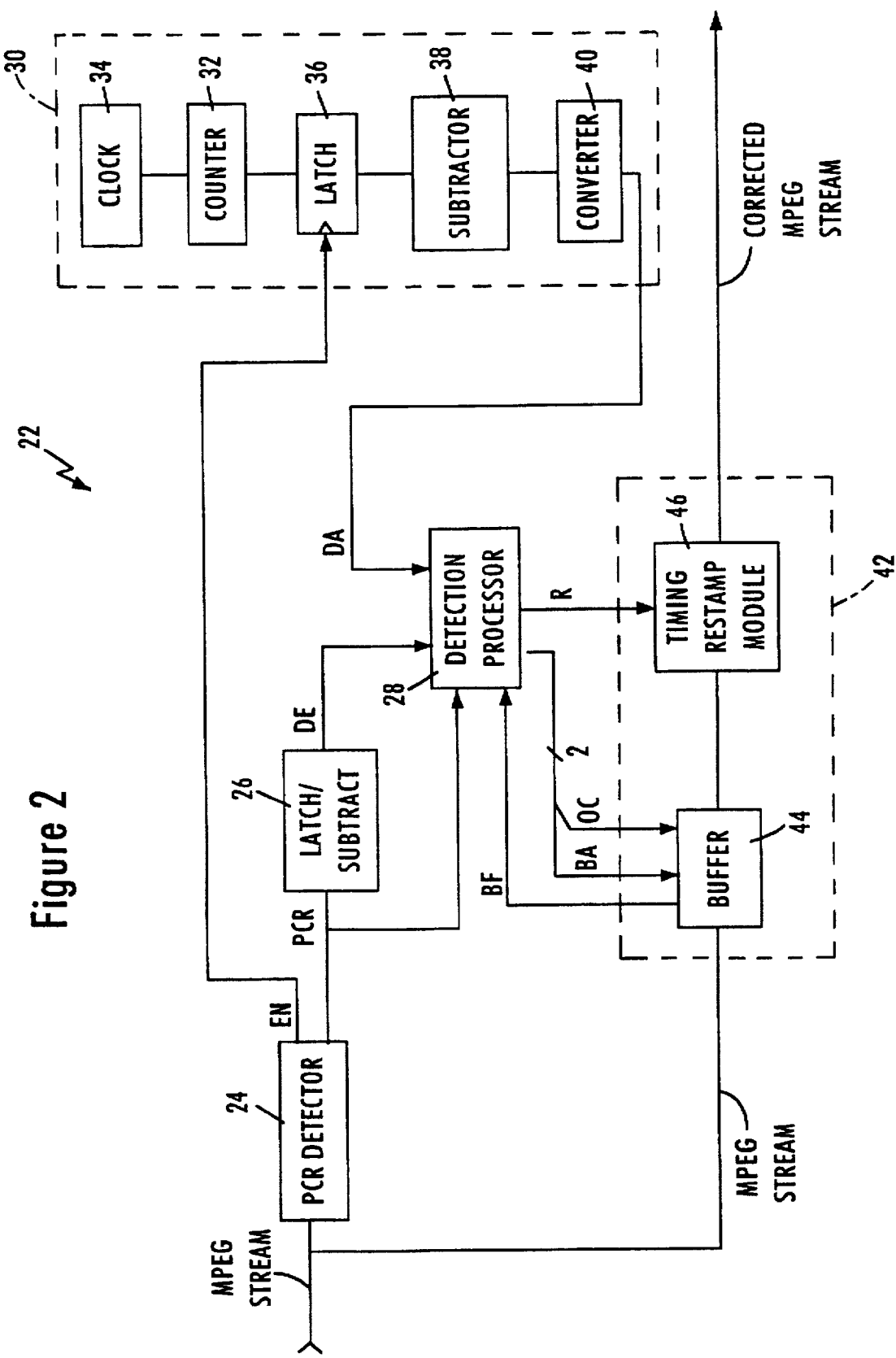
FIG. 2 is a block diagram of a jitter correction device according to a preferred embodiment of the present invention.

FIG. 2 is a block diagram of a jitter correction device according to a preferred embodiment of the present invention. The jitter correction device 22 is adapted to receive a MPEG-encoded data packet stream that has been transported through a broadband transport network. Although the received MPEG-encoded packet stream may have jitter due to transport over various types of networks, the present invention is particularly adapted to correcting for jitter created by cell delay variations during transport via an ATM network. Moreover, although the jitter correction device 22 is disclosed as receiving an MPEG-encoded data stream, it will be appreciated that any digitally coded data stream may be applied that has packets carrying time stamp information at regular intervals in the data stream. For the sake of simplicity, however, the preferred embodiment is disclosed with respect to a jitter correction device that corrects the data rate of the corrected MPEG stream with respect to the enclosed packets carrying program clock reference (PCR) data.

The MPEG stream supplied to the PCR detector 24 and a correction circuit 42 (discussed in detail below) is a single selected MPEG program having a specific program identification (PID) value. Thus, the jitter correction device 22 will typically be connected to a program selector (not shown) that selects a specific MPEG stream from a stream of multiplexed MPEG streams on the basis of a specific PID value.

As shown in FIG. 2, the jitter correction device 22 comprises a PCR detector 24 that detects each occurrence of a PCR value in the MPEG stream. As indicated above, the PCR value represents the expected arrival time of the particular data packet in the data stream. The PCR value is generated during encoding in the real time encoder 718 shown in FIG. 7. The program clock reference PCR value is carried in an optional adaptation field within an MPEG packet, as discussed in detail below with respect to FIG. 3, and is presented at regular intervals within the transport packets. In this example, the PCR may be present in as few as ten out of every four thousand transport packets. Upon detecting a PCR value, the PCR detector 24 outputs a detection signal (EN), and outputs the detected PCR value to a latch/subtract circuit 26. As the PCR detector 24 outputs successive PCR values to the latch/subtract circuit 26, the latch/subtract circuit 26 outputs a difference signal $D_E$ representing an expected differential time between two PCR values output by the PCR detector 24. Thus, since each PCR value represents the expected arrival time of the corresponding transport packet carrying the PCR value, the expected differential time $D_E$ represents the expected interarrival time for the data packet stream segment having as end points the data packets carrying the successive PCR values.

The detection processor 28 also receives a signal $D_A$ representing an actual interarrival time for the corresponding data packet stream segment. The signal $D_A$ is generated by a timing circuit 30 that outputs the actual interarrival time signal $D_A$ in response to the detection signal (EN) from the PCR detector 24, and in response to an independent clock signal.

The timing circuit comprises a counter, such as a modulo $2^{30}$ counter, that increments and outputs a count value in response to the independent clock signal. As shown in FIG. 2, the independent clock signal is generated by clock 34. The independent clock 34 is a clock having a clock rate that is independent of the detection of the PCR values from the received MPEG stream. Thus, unlike the VCXO in FIG. 1, the independent clock 34 is not affected by differential delays in the MPEG stream, and therefore is able to measure the actual interarrival time of the MPEG stream segment between successive PCR values.

The independent clock 34 may be implemented as a crystal oscillator that is synchronized to well-known reference time standards. Alternatively, the clock signal may be provided from a separate source, such as a network clock, or a GPS receiver. In any event, the clock 34 is independent of the received MPEG stream and the detected PCR values.

The counter 32 outputs the count value to a latch circuit that latches the count value from the counter 32 in response to the detection signal (EN) from the PCR detector 24. The latch circuit 36 outputs the latched count value to a subtractor 38 until another detection strobe (EN) is output by the PCR detector 24. The subtractor 38 compares successive count values and outputs the count difference representing the differential count value between successive latched values to a time converter 40. The time converter 40 converts the differential count value output by the subtractor to a recognizable format, such as milliseconds or clock cycles of a 27 MHz clock. Alternatively, the functions of the time converter 40 may be performed in the detection processor 28.

Thus, the detection processor 28 receives two differential time values, namely, an expected interarrival time DE generated on the basis of the PCR values transported by the MPEG stream, and an actual interarrival time $D_E$ generated by measuring the detection of successive PCR values using an independent clock source. Thus, the detection processor 28 is able to detect jitter in the data packet stream between each MPEG packet stream segment on the basis of the corresponding expected interarrival time $D_E$ and the corresponding actual interarrival time $D_A$.

As discussed in detail below, the detection processor 28 calculates (i.e., detects) the jitter based on the difference between the expected differential time $D_E$ and the actual differential time $D_A$. The detected jitter value is used to generate control signals for a data packet stream correction circuit 42 that receives the MPEG stream transported through the network and outputs a corrected data packet stream having PCR values that identify an expected interarrival time substantially coinciding with the actual time duration of the corresponding data packet stream segment. The data packet stream correction circuit 42 selectively uses one of two techniques to eliminate the jitter from the MPEG stream caused by, for example, cell delay variation. One technique, as discussed in detail below, involves selectively buffering the MPEG stream using a buffer 44 in response to buffer control signals from the detection processor 28 (BA, OC). The second technique for correcting for the jitter in the MPEG stream is by using a timing restamp module 46, whereby the PCR values stored in the MPEG stream are rewritten with corrected time stamps in accordance with the detected jitter. As shown in FIG. 2, the data packet stream correction circuit comprises the buffer circuit 44 and the time restamped module 46. As such, either technique may be used alone or in combination to provide the corrected MPEG stream. As discussed in detail below, the detected MPEG stream is output either to an MPEG receiver system, such as a digital entertainment terminal, or a multiplexing system that multiplexes the corrected MPEG stream with other data streams for further transmission throughout the broadband network.

Figure 3:
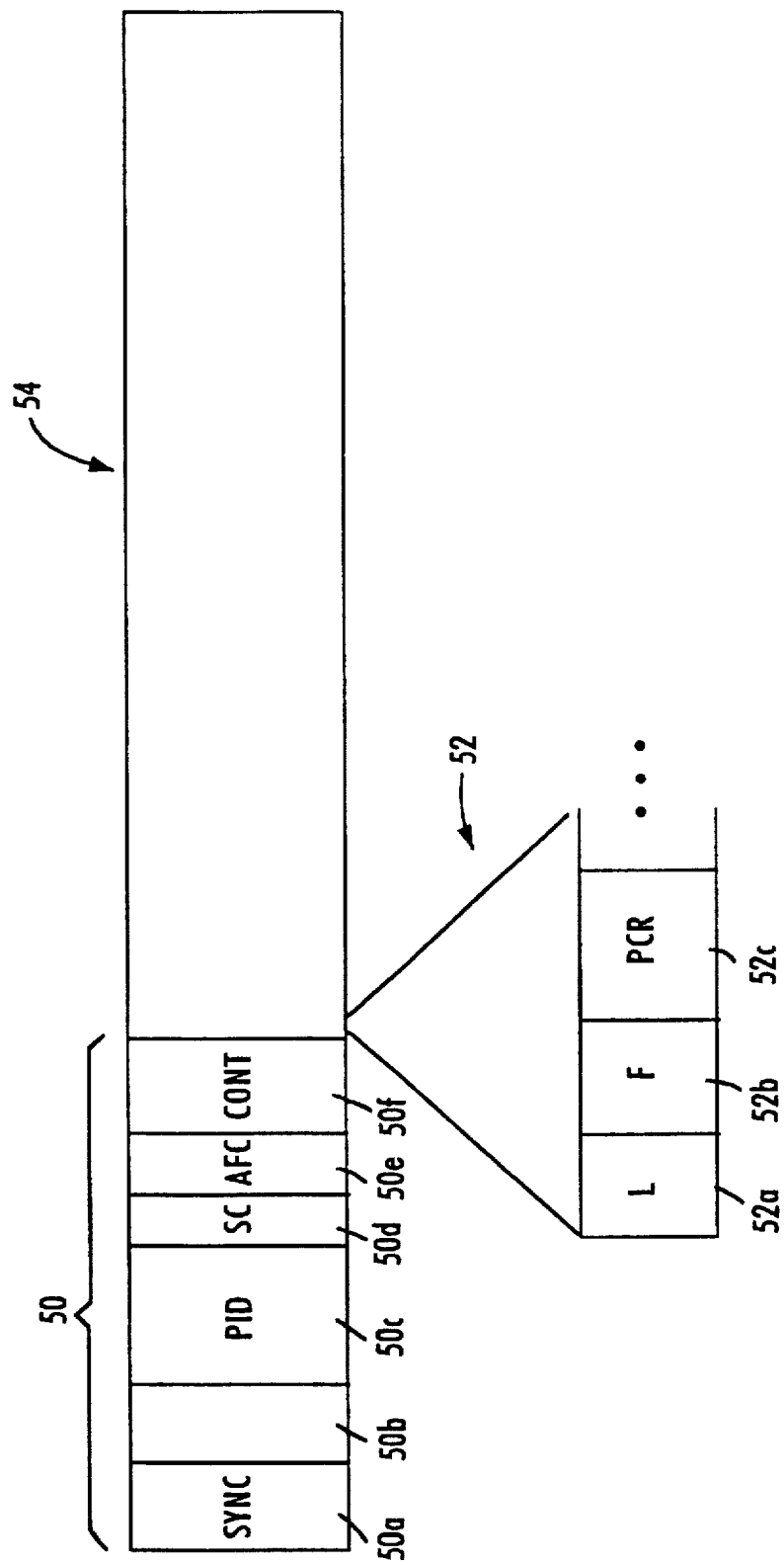
FIG. 3 is a simplified illustration of a format structure of an MPEG-2 encoded data packet.

FIG. 3 discloses a simplified illustration of a format structure of an MPEG-2 encoded data packet. As discussed above, the MPEG transport packet has a fixed 188 byte size. The transport stream packet shown in FIG. 3 has a 4-byte header section 50, an optional adaptation field 52, and a payload section 54. The header information includes a synchronization byte (SYNC) 50a, a flag portion 50b having three 1-bit flags, for example, start indicator and transport error indicator. The header section 50 also includes a 13-bit program identification (PID) 50c. The header 50 also includes a 2-bit scrambling control (SC) 50d, a 2-bit adaptation field control (AFC) 50e, and a 4-bit continuity counter (CONT) 50f. The adaptation field control 50e identifies the presence of the optional adaptation field 52.

The optional adaptation field 52 comprises a length byte (L) 52a, an 8-bit flag portion (F) 52b, and a 42-bit PCR field 52c. One of the flags in the flag field 52b is a PCR flag, whereby if the flag is set to 1, then the PCR value is present; however, if the PCR flag is 0, then the PCR value is absent. Therefore, the PCR detector 24 identifies the occurrence of the PCR value in the optional adaptation field by reading the adaptation field control 50e to determine whether an optional adaptation field is present. If the 2-bit adaptation field control 50e identifies the presence of the optional adaptation field 52, the PCR detector 24 checks the PCR flag in the flag portion 52b to determine whether the PCR value is present. If the PCR flag indicates that the PCR value is present, the PCR detector outputs the PCR detection signal (EN) and reads the PCR value from the PCR field 52c.

According to the present invention, the jitter is determined by the comparison of expected interarrival time to actual interarrival time. The actual interarrival time is measured based on the detection of the PCR values. As such, a voltage controlled oscillator is not used, as opposed to the prior art, which uses a 27 MHz voltage controlled oscillator to synchronize the VCXO to the detected PCR values. Moreover, the independent clock, such as clock 34, may use different data clock rates, as desired. As such, the burden is effectively on the detection processor 28 to calculate the time in seconds, in the absence of the converter 40. Preferably, the converter 40 outputs the differential count values as 27 MHz clock cycles.

Figure 4A:
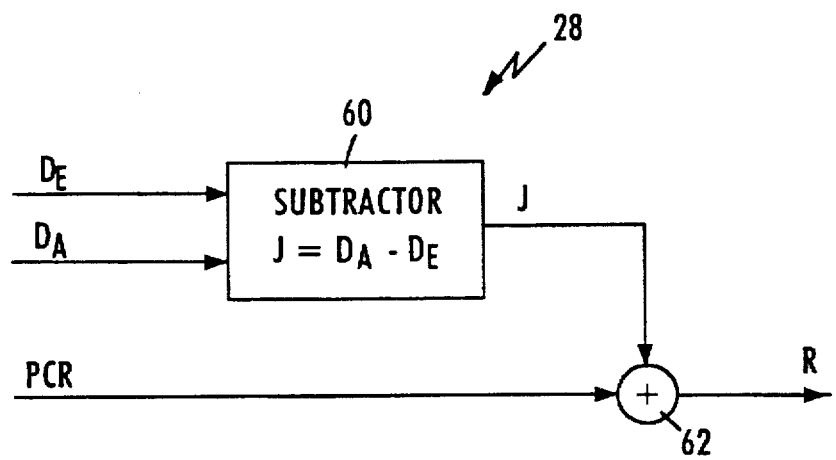
FIGS. 4A and 4B are block diagrams illustrating different implementations of the detection processor of FIG. 2.
Figure 4B:
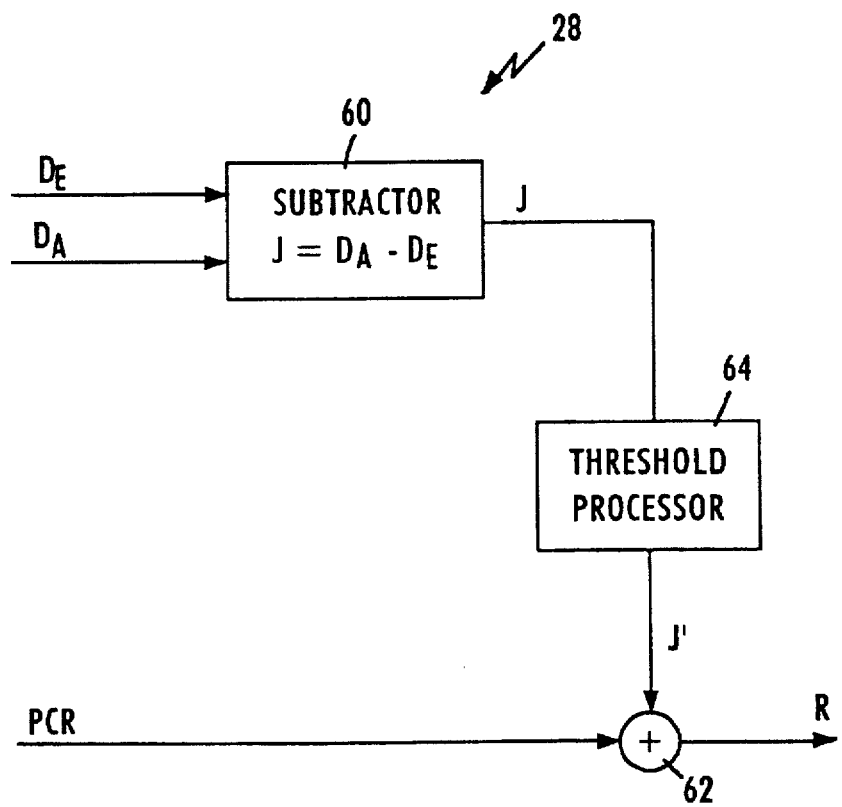

FIGS. 4A and 4B are block diagrams illustrating different implementations of the detection processor 28 of FIG. 2. According to the processor 28 shown in FIG. 4A, the expected interarrival time $D_E$ and the actual interarrival time $D_A$ are supplied to a subtractor circuit 60. The subtractor circuit calculates the jitter value J as the difference between the actual interarrival time and the expected interarrival time such that $J=D_A-D_E$. The calculated jitter value J is output to an adder circuit 62 that adds the calculated jitter value to the PCR value output from the PCR detector 24. The adder 62 calculates the correct PCR value and outputs a restamp signal (R) to the timing restamp module 46.

According to the present invention, the estimation accuracy of the PCR values is based on the accuracy of the MPEG clock in the encoder 718 shown in FIG. 7, and the accuracy of the independent clock 34. Thus, according to the preferred embodiment, the jitter can be calculated to a resolution of at least within 10 microseconds.

FIG. 4B illustrates another implementation of the detection processor 28. As shown in FIG. 4B, the detection processor 28 further comprises a threshold processor 64 that determines an effective jitter value J' in accordance with predetermined thresholds. For example, the threshold processor 64 may include threshold logic so that if the jitter value J is less than 10 microseconds, then the effective jitter value J' equals 0, resulting in no adjustment to the PCR values. If, however, the jitter value J is 100 microseconds, then the jitter value J' is set at 50 microseconds. Finally, if the jitter value J is equal to 1000 microseconds, then the jitter value J' is set to 950 microseconds. The logic of the threshold processor 64 is based on a normalized distribution whereby there is a greater probability that jitter values will be on the order of ±100 microseconds than a jitter value of ±1000 microseconds. Thus, the effective jitter value is adjusted to ensure that additional errors are not introduced to the PCR values.

As will be recognized in the art, the threshold processor 64 may be modified to perform as an adaptive jitter calculator, whereby statistics of previously calculated jitter values may be used to better anticipate the occurrence of jitter in a particular broadband data stream at predetermined time periods. Also, values of $D_E$ and $D_A$ may be accumulated so that the jitter may be calculated over a longer data segment with a fixed endpoint.

Referring to FIG. 2, the restamp values calculated by the detection processor 28 are output to the timing restamp module 46 when the timing restamp mode is used in the jitter correction device 22. The timing restamp module 46 includes a restamp writing circuit (not shown) that writes the restamp value R into the PCR field 52c as the corrected PCR value. In the event that a combination of the buffer techniques and the timing restamp techniques is desired, the restamp value R is provided to buffer control circuitry (not shown) in the detection processor 28, which translates the restamp value to the appropriate buffer control signals to the buffer 44.

In addition, the buffer 44 outputs buffer fullness signals (BF) to the detection processor 28 indicating the relative fullness of the buffer 44 with MPEG data. Specifically, the buffer 44 is preferably a first-in, first-out (FIFO) buffer that receives the MPEG stream at a particular input data rate. The input data rate will typically be 6 Mbits/sec, with a maximum rate of 15 Mbits/sec. The buffer 44 should be large enough to carry at least one MPEG stream segment, i.e., at least large enough to carry at least two packets carrying PCR values. Since the maximum separation between two PCR values is approximately 0.1 seconds, the buffer 44 needs a maximum size of 1.5 Mbits. Typically, however, a data rate of 6 Mbits/sec will require only a buffer having a size of 0.6 Mbits.

In the buffer correction mode, the jitter correction device 22 operates on the assumption that the buffer 44 will have empty locations, depending on the input data rate. Ideally, the buffer 44 is 50% full with valid data. By adjusting the fullness of the buffer 44, the MPEG stream can be adjusted so that the PCR values correspond correctly to the duration, or interarrival time of the MPEG stream segment. In other words, the detection processor 28 outputs a buffer adjust control signal (BA) to change the fullness of the buffer 44 in order to lengthen or shorten the MPEG data stream segment by changing the time spacing between the packets output from the buffer.

A second approach using the buffering technique is adjusting the output data rate of the buffer 44. Specifically, for a 6 Mbit/sec input stream, in which there is no detected jitter, the buffer 44 will output the MPEG stream at a data rate of 6 Mbit/sec. If, however, the detection processor 28 determines the presence of jitter, then the detection processor changes an output clock signal (OC) to increase or decrease accordingly the output data rate of the buffer 44 to compensate for the jitter. Thus, the buffer output data rate is adjusted so that the PCR values correctly correspond to the interarrival time of the data stream segment. Thus, if a PCR value entered the PCR detector too early, then the output data rate of the buffer 44 would be slowed down accordingly. If, however, the PCR value entered the PCR detector too late, then the output data rate of the buffer 44 would be increased. Thus, the buffer 44 can be used either to change the spacing between MPEG packets, or to change the output data rate in order to compensate for the detected jitter.

Figure 5A:
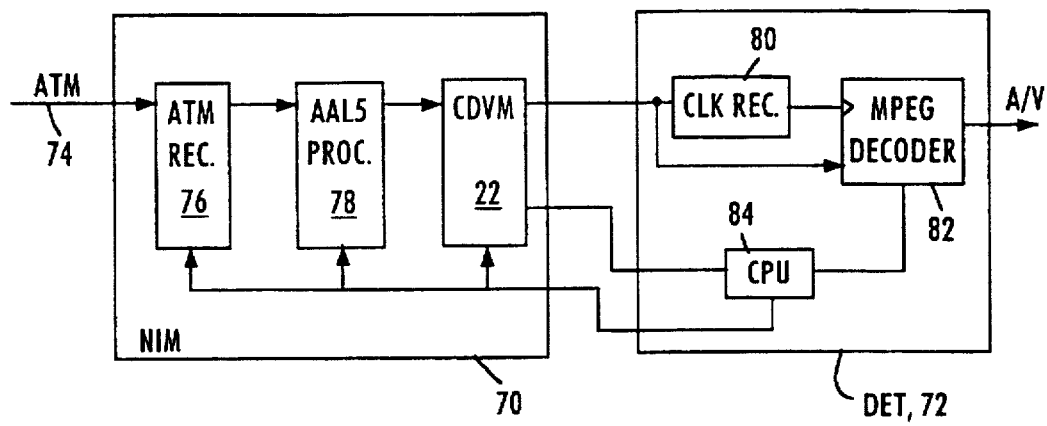
FIGS. 5A, 5B and 5C are exemplary implementations of the jitter correction device in various receiver systems at a subscriber premises.

FIG. 5A discloses an exemplary implementation of the jitter correction device within a network interface module (NIM) 70 for a broadband network that provides specified ATM cell streams to the NIM. The NIM 70 shown in FIG. 5A acts as the network interface at a subscriber premises, also referred to a living unit, between the broadband network and a digital entertainment terminal (DET) 72. The DET 72 is coupled to the NIM by a high bit rate broadband connection and a low bit rate signaling connection. The broadband connection is a one-way downstream only connection, but the low-bit rate signaling connection is a two-way connection, whereby the network interface module includes means to multiplex and demultiplex signals carrying signaling information for transmission/reception over the coaxial cable drop 74.

Typically, each living unit is preassigned a single data stream, or up to three DS-3 slots for broadband service. Although FIG. 5A shows only one DET 72, each home or living unit having a NIM 70 is preferably allocated a capacity of four digital entertainment terminals 72, with three being active at any one time. A coaxial drop 74 for each living unit carries 180 Mbits/sec baseband digital data, which will simultaneously transport three 45 Mbits/sec DS-3 ATM streams. The three channels for a particular living unit are individually assignable to different DET's 72 within the subscriber's premises. The network supplies the DS-3 ATM stream to appropriate channels on the coaxial cable 74 going to the subscriber premises.

As part of an initial handshaking procedure, when a subscriber turns on a DET 72, a DS-3 channel on the particular subscriber's coaxial drop cable 74 is assigned to the DET 72. Upstream and downstream slots are also assigned for signaling purposes, as part of the initial handshaking. When a subscriber requests a broadcast channel, the DET 72 provides a subscriber selection signal identifying the selected channel. In response to the subscriber selection signal, the network transmits a signal to the NIM identifying the particular ATM virtual circuit (VPI/VCI) within that DS-3 stream which carries the requested broadcast program, and routes the particular DS-3 to the appropriate channel on the requesting subscriber's coaxial drop cable 74 going to the subscriber's premises.

The NIM includes means to selectively demodulate received data from an assigned one of the three DS-3 slots on the coax cable 74. Specifically, the NIM 70 captures each ATM cell bearing the specified VPI/VCI header information corresponding to the selected program channel from the DS-3 stream. The NIM 70 includes a ATM cell receiver 76 that captures each ATM cell having a specified VPI/VCI. The ATM cell receiver 76 outputs the captured ATM cells to an AAL5 processor 78, which buffers cells until it finds a cell having an ATM cell Adaptation Unit (AAU) value of "0" in its header (first cell) and another cell having an AAU value of "1" in its header (last cell). The AAL5 processor 78 counts the number of cells from first to last to determine the type of adaptation used to map cells.

If the AAL5 processor 78 has captured a complete protocol data unit (PDU) containing five cells, the AAL5 processor 78 pulls out the payload data and uses the CRC data to check for errors. If there are no errors, the original MPEG packet is reconstructed from the appropriate bytes of payload data from the first four cells. Similarly, if the AAL5 processor 78 has captured a complete PDU containing eight cells, the processor 78 pulls out the payload data, does the CRC based error check, and if there are no errors, the original pair of MPEG packets is reconstructed from the appropriate bytes of payload data from the eight cells. The reconstructed MPEG packets are then output from the AAL5 processor as a reconstructed MPEG packet stream.

As discussed above, the reconstructed MPEG packet stream may have jitter due to cell delay variation during transport through the broadband network. Therefore, the NIM 70 includes the jitter correction device (JCD) 22 disclosed in FIG. 2. Since the jitter correction device 22 is specifically implemented in a network providing ATM cell transport, the jitter correction device 22 is also referred to as a cell delay variation module (CDVM). The CDVM 22 receives the reconstructed MPEG packet stream and selects those MPEG packets that have a specified PID value. The MPEG packets having a specified PID value are processed by the CDVM 22 in order to eliminate the jitter caused by the cell delay variation. The CDVM outputs the corrected MPEG stream to the DET 72 for decompression of the MPEG packets.

The DET 72 comprises a clock receiver 80, an MPEG decoder system 82, and a CPU 84 providing control functions including program selection, session management functions, control channel downloading, etc. A more detailed description of the DET 72 is found in commonly-assigned, copending application Ser. No. 08/380,755, filed Jan. 31, 1995, U.S. Pat. No. 5,734,589 entitled DIGITAL ENTERTAINMENT TERMINAL WITH CHANNEL MAPPING, the disclosure of which is incorporated in its entirety by reference. The clock receiver 80 performs the same functions as prior art clock recovery circuits. Thus, the clock receiver 80 obtains the PCR values from the corrected MPEG stream from the CDVM 22 and synchronizes an internal oscillator with the PCR values from the corrected MPEG stream in order to enable decoding of the corrected MPEG stream. The clock receiver 80 outputs the synchronized clock signal to the MPEG decoder 82 for decompression of the corrected MPEG stream.

On decompression, the MPEG-2 decoder 82 in sequence reconstructs the frames for a particular program from packets bearing the appropriate PID value, decompresses the compressed digital video information, and outputs the decompressed digital video information in the appropriate format to a display device, such as a television or a computer display.

The CPU 84 in the DET 72 may be a Power PC, Pentium, 386 or 486-type microprocessor. Although not shown, the DET 72 also comprises associated memory (RAM, ROM and EPROM). The DET 72 also includes a graphics display generator for generating displays of text data, such as the initial turn-on selection menu for overlay on or replacement of a video program stream. The DET also includes digital to analog converters and appropriate drivers to produce output signals compatible with a conventional television set.

According to the preferred embodiment, the DET 72 is a programmable device with software for broadcast channel selection and decoding residing permanently in the DET memory. Additional software may be downloaded into the DET 72 as applications programs to facilitate certain interactive services. A more detailed description of the structure of the DET and the operations thereof involved in downloading applications software and operating system changes into the DET are disclosed in copending applications Ser. No. 08/250,791, filed May 27, 1994 and the above-identified application Ser. No. 08/380,755, filed Jan. 31,1995 the disclosures of which are incorporated herein in their entirety by reference.

Figure 5B:
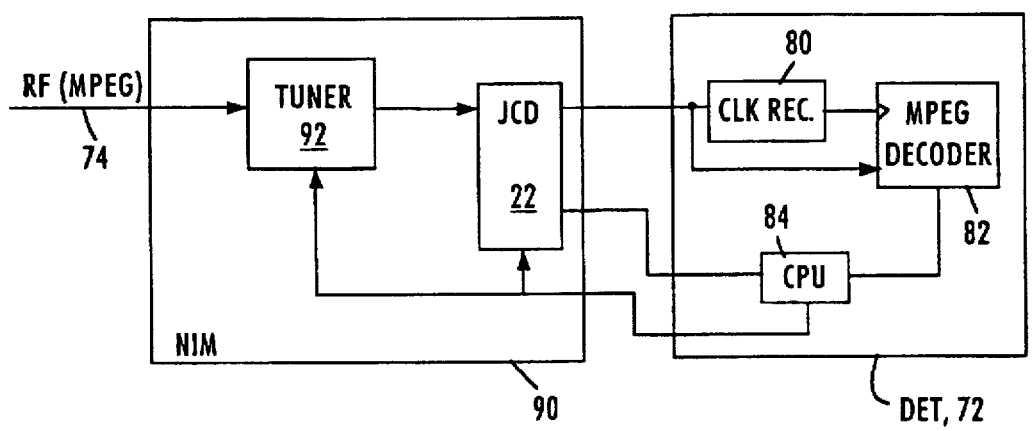

FIG. 5B shows an exemplary implementation of a NIM that is designed to receive a stream of MPEG-encoded data streams on a plurality of RF channels from a coaxial drop cable 74 served by a broadband network providing network transport. The NIM 90 shown in FIG. 5B is designed for use with a network that utilizes a plurality of access technologies to supply broadband data, including ATM transport via optical fiber, and synchronous RF transport via coaxial cable. An exemplary network disclosing the relationship between the NIM and such a hybrid fiber-coaxial cable arrangement is disclosed in commonly-assigned, copending application Ser. No. 08/413,207, filed Mar. 28, 1995, U.S. Pat. No. 5,544,161, entitled ATM PACKET DEMULTIPLEXER FOR USE IN FULL SERVICE NETWORK HAVING DISTRIBUTED ARCHITECTURE, the disclosure of which is incorporated in its entirety by reference.

In this hybrid-fiber coaxial network configuration contemplated with respect to FIG. 5B, the NIM 90 includes an analog frequency tuner 92 controlled by the microprocessor 84 to selectively receive the RF channel signals from the coaxial drop cable 74, including those channels carrying digital information. The NIM also includes a QPSK, QAM or VSB demodulator (not shown) to demodulate a selected one of the digitized program signals carried in one of the digital slots within a received 6 MHz channel and performs a forward error correction function on the demodulated data.

The analog tuner 92 in the NIM 90 tunes in all channel frequencies carried by the network, including those used for the analog broadcast services. The RF tuner 92 translates the desired channel, containing either digital or analog information, to a 43.75 MHz IF signal. The IF signal contains either digital or analog information. The tuner 92 utilizes a dual conversion technique with synthesized local oscillators, and has an input tuning range of 50 MHz to 860 MHz. The tuner 92 demodulates the RF signal at a user-specified channel frequency.

If the demodulated RF signal is an analog video signal from an analog source, the NIM 90 passes the baseband analog video signal directly to the television set (not shown) without further processing by the DET 72. If, however, the NIM 90 receives an MPEG encoded signal, if the MPEG encoded signal has a PID value corresponding to the NIM's assigned PID value, the NIM 90 processes the MPEG stream as NIM signaling data after jitter correction by the jitter correction device 22. If, however, the PID value corresponds to the DET address, the NIM performs MPEG processing on the MPEG stream as DET signaling data, performs jitter correction in the jitter correction device (JCD) 22, and outputs the recovered DET signaling data to the DET CPU. Otherwise, the corrected MPEG stream is passed to the DET as information-carrying (e.g., video) MPEG streams after the NIM has de-encrypted the 27 Mb/s MPEG encoded signal using a key downloaded from the network. The processor 84 within the main portion of the DET 72 identifies an MPEG stream to be transmitted to the DET 72 by the PID value. Thus, the DET 72 decodes only an MPEG stream having a specified MPEG PID value in accordance with the user's request for service.

Although the NIM 90 is disclosed as having only one JCD 22, in actual implementation there may be three such devices dedicated for different data streams: NIM signaling data, DET signaling data, and DET broadband data (e.g., video). Alternately, the JCD 22 may be programmable to process and route corrected MPEG data streams in response to PID values supplied by the CPU 84.

Although not shown, the DET 72 includes a remote control and/or keypad to receive various selection signals from a user. The DET relays data signals upstream over a signaling channel on the coaxial cable 74 to the network in response to user inputs such as selection of a pay per view event.

The MPEG decoder 82 includes an audio and video portion (not shown), whereby the video portion decompresses received video packet signals to produce a digital video signal, and the audio portion of the MPEG decoder 82 decompresses received audio packets to produce left and right digitized stereo signals. For at least some functions, the MPEG decoder may be controlled in response to signals from the microprocessor. The video portion of the MPEG decoder will internally include at least 2 MBytes of RAM for use as a frame reorder buffer for at least two frames during the MPEG video decoding process, and the audio portion of the MPEG decoder also may include some buffer memory.

Figure 5C:
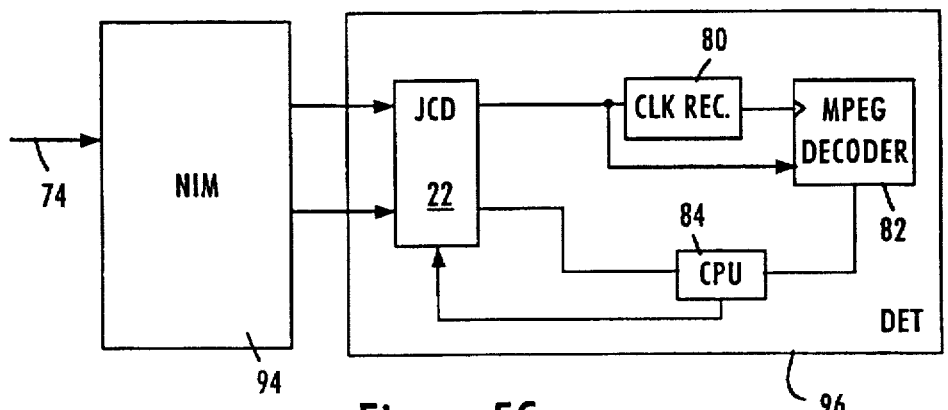

FIG. 5C discloses an alternative arrangement of the NIM/DET receiver system that can be used used in any broadband network providing broadband data to a NIM 94 via the coaxial drop cable 74. In this arrangement, the NIM 94 is similar to the network interfaces 70 and 90 in that NIM 94 acts as a network-specific interface for receiving data signals from a broadband network. For example, in a hybrid-fiber coax architecture such as suggested in FIG. 5B, the NIM 94 could be identical to the NIM disclosed in the identified copending application Ser. No. 08/413,207. Thus, the NIM 94 would provide the same MPEG-encoded connections to the DET 96, namely a high data rate broadband connection and a low data rate signaling connection.

The digital entertainment terminal 96 in FIG. 5C, however, differs from the DET 72 in that the jitter control device 22 is implemented within the DET 96 and receives the high data rate MPEG streams and the low data rate MPEG streams to perform jitter correction before being output to the other DET components. Alternatively, if jitter correction on the low data rate MPEG stream is not necessary, the jitter control device 22 may be bypassed, so that only the high data rate (broadband) MPEG streams are supplied to the jitter correction device 22. Thus, the digital entertainment terminal 96 is an improvement over the DET 72 in that the DET 96 has its own jitter correction circuitry.

Specifically, the NIM 94 is specialized to the network access technology and data stream format provided by the coaxial drop cable 74. Thus, the NIM 94 will be substituted at a subscriber premises depending on the local access technology, such as fiber to the home, or ADSL as suggested in the above-identified Litteral patent. The NIM/DET interface, however, follows a generic consumer electronics (CE) protocol. Thus, when implemented as a consumer product, the DET 96 is able to minimize jitter in any broadband network, regardless of the access technology.

Figure 6:
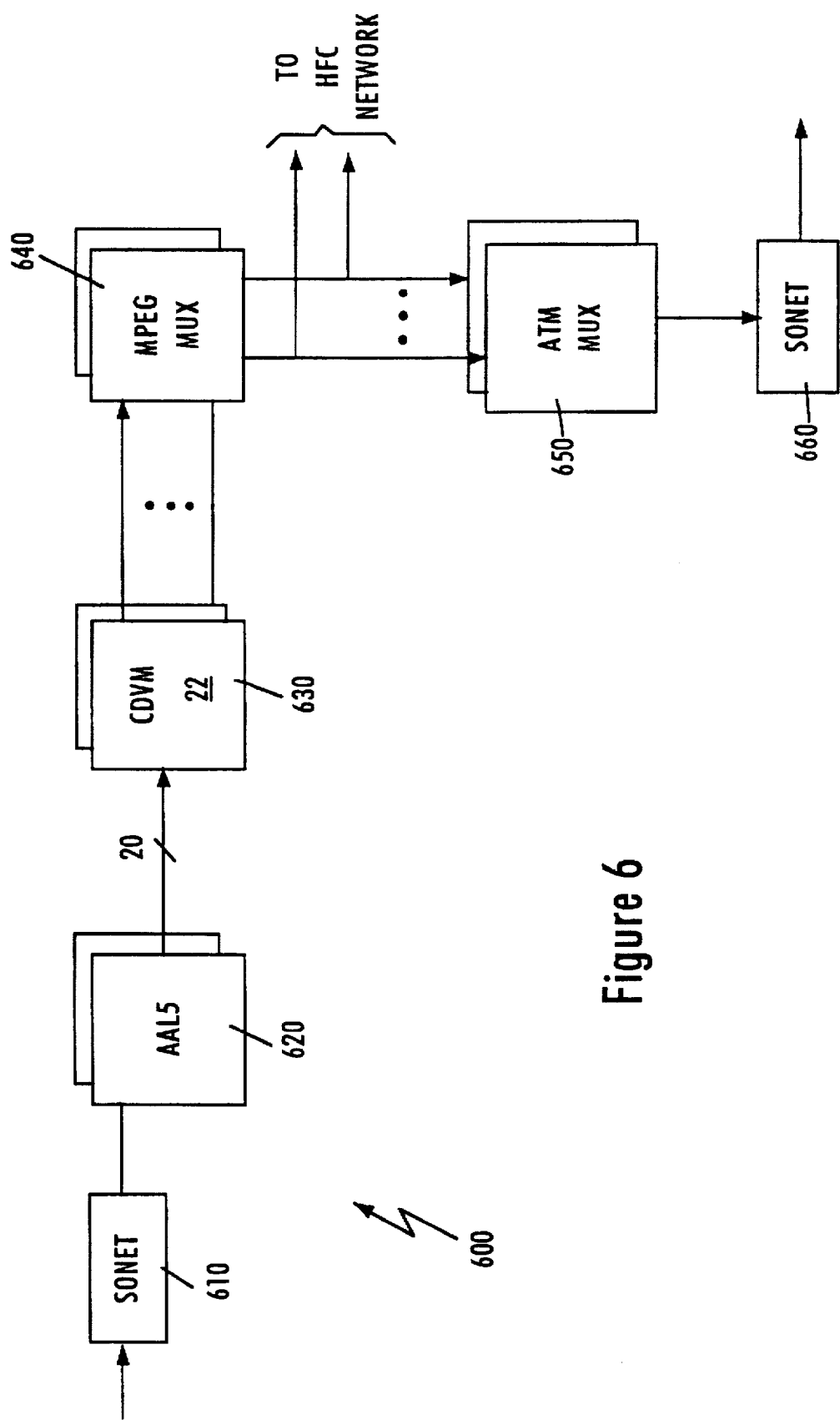
FIG. 6 is an exemplary implementation of the jitter correction device in a network node.

FIG. 6 discloses an ATM packet demultiplexer implementing the cell delay variation module of the present invention. The ATM packet demultiplexer is of the type described in the identified, copending application Ser. No. 08/413,207. Specifically, the ATM packet demultiplexer is typically used at a video end office to demultiplex ATM cell streams from an ATM broadband network to MPEG-encoded data output on selected RF channels to a local loop distribution network. The cell delay variation module 22 of the present invention is added to eliminate jitter present in the MPEG-encoded data before transmission to the local loop distribution network. However, the ATM packet demultiplexer may also be used to minimize cell delay variations in ATM cell streams carrying MPEG data before further transmission in an ATM network. In other words, the corrected MPEG stream may be repacketed by an ATM multiplexer that outputs the corrected MPEG stream in a new ATM cell stream for further transmission on the network.

The disclosed ATM packet demultiplexer (APD) is designed to process an ATM cell stream having a specified VPI/VCI value. Thus, a plurality of APD's will typically be arranged in parallel when implemented in an ATM network, whereby each APD will receive a dedicated virtual path on the basis the a predetermined VPI/VCI range. In other words, each APD serves a predetermined range of VPI/VCI values on the dedicated virtual path.

As shown in FIG. 6, the preferred ATM packet demultiplexer 600, also referred to as an MPEG router, comprises an input processor 610, an ATM adaptation layer (AAL5) processor 620, a cell delay variation module 630, and a transport multiplexer (MPEG MUX) 640. If the ATM is implemented as a jitter correction node in an ATM network, the jitter correction node will also include an ATM multiplexer 650 and an output interface 660. The input processor 610 is preferably a SONET interface that receives OC-3c ATM stream from ATM network. The interface 722 performs clock and frame recovery of the SONET frame, cell delineation, Header Error Check (HEC) verification, and deletion of unassigned or idle ATM cells. The ATM stream is output to the AAL5 processor 620.

The AAL5 processor 620 performs ATM Adaptation Layer (AAL-5) processing to reassemble the ATM cell payloads and perform a CRC and length check. Specifically, the AAL5 processor 620 buffers cells until it finds a cell having an ATM cell Adaptation Unit (AAU) value of "0" in its header (first cell) and another cell having an AAU value of "1" in its header (last cell). The AAL5 processor 620 counts the number of cells from first to last to determine the type of adaptation used to map cells.

If the AAL5 processor 620 has captured five cells, the receiver pulls out the payload data and uses the CRC data to check for errors. If there are no errors, the original data is reconstructed from the appropriate bytes of payload data from the first four cells. Similarly, if the receiver has captured eight cells, the AAL5 processor 620 pulls out the payload data, does the CRC based error check, and if there are no errors, the original data contained in the Protocol Data Unit (PDU) is reconstructed from the appropriate bytes of payload data from the eight cells.

The PDU's carrying broadband data are output to the CDVM 630 to correct for jitter caused by cell delay variation, as discussed above in detail with respect to FIG. 2. The corrected MPEG stream is then output to an MPEG multiplexer 640 for multiplexing to the appropriate output stream. Although not shown, the APD 600 may also include additional components for multiplexing the MPEG-encoded data streams for distribution in the hybrid fiber coax-type (HFC) network, such as an out-of-band signalling processor outputting signalling data.

The MPEG multiplexer 640 multiplexes the corrected MPEG streams to one of five output 27 MB/s transport streams in accordance with the routing information from network control and network provisioning systems. In addition, the MPEG multiplexer 640 monitors PID faults, erroneous packets, loss packets, and redundant packets in each transport stream. Finally, the MPEG multiplexer 640 outputs the five 27 MB/s transport streams to either a TAXI interface (not shown), which outputs the five 27 MB/s transport streams to QAM modulators for distribution to the HFC network, or to an ATM multiplexer 650, which performs ATM cell processing to output an new stream of ATM cells to a SONET output interface 660.

The present invention provides an arrangement for detecting and correcting for jitter in MPEG-encoded data streams caused by cell delay variations during transport through an ATM broadband network. The disclosed jitter correction device provides corrected MPEG streams, whereby the stored PCR values identify an expedted interarrival time substantially coinciding with the actual time duration of the corresponding data packet stream segment from the corrected MPEG stream. Unlike the prior art, the variations in the PCR values are detected using an independent clock source, thereby ensuring that no errors arise due to jitter in the MPEG stream. Moreover, the corrected MPEG stream can be formed either by selectively buffering the received MPEG stream, by restamping the stored PCR values with corrected PCR values, or a combination of the two.

Although the preferred embodiment of the present invention has been described with respect to the transport of MPEG-encoded data streams in an ATM network, it will be appreciated that any coding standard can be used for the data being transported, so long as the coded data stream includes time stamp information at regular intervals identifying an expected interarrival time of the corresponding data packet stream segment.

Moreover, the present invention is not limited to detecting jitter caused by cell delay variation in ATM networks. Rather, the present invention may be used to identify switching or multiplexing malfunctions in the broadband transport network. As such, the jitter detection arrangement of the present invention may be used to monitor the transport of broadband data throughout the network. Such an arrangement may have a plurality of jitter detection devices distributed throughout the network, each supplying the detected jitter information to a centralized network operations center for traffic management, fault indicators, etc.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for minimizing jitter caused during transmission of a data packet stream, comprising:

a time stamp detector for detecting time stamp values located within said data packet stream, each pair of time stamps representing an expected interarrival time of a corresponding data packet stream segment;

a timing circuit, responsive to a clock signal, for determining an actual interarrival time for each said corresponding data packet stream segment;

a detecting circuit for detecting jitter in each data packet stream segment on the basis of the corresponding expected interarrival time and the corresponding actual interarrival time; and a data packet stream correction circuit, responsive to the detected jitter, outputting said data packet stream as a corrected data packet stream having time stamps identifying an expected interarrival time substantially coinciding with an actual time duration of each corresponding data packet stream segment of said corrected data packet stream.

2. An apparatus as recited in claim 1, wherein said data packet stream correction circuit comprises a timing restamp module replacing said time stamps with corrected time stamps in accordance with said detected jitter.

3. An apparatus as recited in claim 2, wherein said data packet stream correction circuit further comprises a buffer circuit receiving said data packet stream for adjusting said actual time duration of each said corresponding data packet stream segment in accordance with said detected jitter.

4. An apparatus as recited in claim 3, wherein said buffer circuit has an output data rate controlled in response to said detected jitter.

5. An apparatus as recited in claim 3, wherein said buffer circuit selectively adjusts a spacing between packets in said data packet stream in accordance with said detected jitter.

6. An apparatus as recited in claim 3, further comprising an independent clock source outputting said clock signal.

7. An apparatus as recited in claim 1, wherein said data packet stream is received in MPEG format, said time stamp detector detecting said time stamp values as program clock reference (PCR) values from an MPEG stream having a selected program identifier (PID) value.

8. An apparatus as recited in claim 7, wherein said data packet stream correction circuit comprises a buffer circuit receiving said MPEG stream for adjusting said actual time duration of each said corresponding data packet stream segment in accordance with said detected jitter.

9. An apparatus as recited in claim 8, wherein said buffer circuit has an output data rate controlled in response to said detected jitter.

10. An apparatus as recited in claim 8, wherein said buffer circuit selectively adjusts a spacing between packets in said MPEG stream in accordance with said detected jitter.

11. An apparatus as recited in claim 8, wherein said buffer circuit adjusts said time duration in accordance with said corresponding detected jitter and a buffer fullness ratio.

12. An apparatus as recited in claim 8, wherein said data packet stream correction circuit further comprises a timing restamp module replacing said PCR values in said MPEG stream with corrected PCR values in accordance with said detected jitter.

13. An apparatus as recited in claim 7, wherein said data packet stream correction circuit comprises a timing restamp module replacing said PCR values in said MPEG stream with corrected PCR values in accordance with said detected jitter.

14. An apparatus as recited in claim 13, wherein said detecting circuit comprises a subtractor for calculating a jitter value as a difference between said expected interarrival time and said corresponding actual interarrival time, and a restamp calculation circuit outputting a restamp value to said timing restamp module as a sum of said detected PCR value and said corresponding jitter value.

15. An apparatus as recited in claim 13, wherein said detecting circuit comprises a subtractor for calculating an actual jitter value as a difference between said expected interarrival time and said corresponding actual interarrival time, a threshold processor for determining an effective jitter value in accordance with predetermined thresholds, and a restamp calculation circuit outputting a restamp value to said timing restamp module as a sum of said detected PCR value and said corresponding effective jitter value.

16. An apparatus as recited in claim 1, wherein said time stamp detector outputs a detection signal upon detecting each of said time stamp values, said timing circuit comprising:

a counter for outputting a count value in response to said clock signal;

a latch circuit latching and outputting said count value in response to said detection signal; and a subtractor circuit for determining a count difference between outputs of said count value from said latch circuit, said count difference corresponding to said actual interarrival time for each said corresponding data packet stream segment carrying said time stamp values.

17. An apparatus as recited in claim 16, wherein said timing circuit further comprises a converter circuit converting said count difference to a time value and outputting said actual interarrival time.

18. An apparatus as recited in claim 1, said timing circuit comprising an independent clock source generating said clock signal.

19. An apparatus as recited in claim 1, further comprising an ATM input processor outputting said data packet stream from an ATM cell stream having a selected virtual path identifier.

20. An apparatus as recited in claim 19, further comprising an ATM output processor outputting a second ATM cell stream carrying said corrected data packet stream.

21. An apparatus for measuring jitter in a transport stream of data packets, comprising:

a clock source independent from the transport stream and outputting a clock signal;

a time stamp detector for detecting time stamp values located within said transport stream at substantially regular interval portions, each time stamp value identifying an expected arrival time of a corresponding interval portion of said transport stream;

a counting portion, responsive to said clock signal, for identifying an actual arrival time for each said corresponding interval portion of said transport stream;

21 a first subtraction circuit outputting an expected differential time in response to outputs of said time stamp values from said time stamp detector;

a second subtraction circuit outputting an actual differential time in response to outputs of said actual arrival times from said counting portion; and a processor for calculating said jitter based on a difference between said expected differential time and said corresponding actual differential time.

22. An apparatus as recited in claim 21, wherein said data packets are MPEG-encoded data packets, said time stamp detector detecting said time stamp values as program clock reference (PCR) values from an MPEG stream having a selected program identifier (PID) value.

23. An apparatus as recited in claim 22, wherein said time stamp detector outputs a detection signal upon detecting each of said PCR values, said counting portion comprising:

a counter for outputting a count value in response to said clock signal; and a latch circuit latching and outputting said count value in response to said detection signal, said count value corresponding to said actual arrival time.

24. A method for measuring jitter in a transport stream of MPEG-encoded data packets, comprising the steps of:

receiving a clock signal independent from the transport stream;

detecting program clock reference (PCR) values from said transport stream expected to be at substantially regular interval portions, each PCR value identifying an expected arrival time of a corresponding interval portion of said transport stream;

identifying an actual arrival time for each said corresponding interval portion of said transport stream in accordance with said independent clock signal;

determining an expected differential time on the basis of PCR values;

determining an actual differential time on the basis of actual arrival times; and calculating said jitter based on a difference between said expected differential time and said corresponding actual differential time.

25. A method as recited in claim 24, further comprising the steps of:

receiving said MPEG-encoded data packets from an asynchronous transfer mode (ATM) stream of cells; and selecting at least one of said MPEG streams in accordance with a selected program identifier (PID) value.

26. A broadband receiver for receiving a data stream carrying asynchronous transfer mode (ATM) cells from a broadband network, comprising:

an ATM stream selector for capturing a selected group of said ATM cells on the basis of a selected identifier value;

an ATM adaptation layer processor for recovering from said group of said ATM cells a digital data stream carrying time stamp values, each pair of time stamp values representing an expected interarrival time of a corresponding digital data stream segment from said digital data stream; and a cell delay variation correction circuit comprising:

(1) a segment delay detection circuit for determining a differential delay between said expected interarrival time of a corresponding digital data stream segment and an actual interarrival time, said segment delay

22 detection circuit calculating said actual interarrival time in response to a detection of a pair of time stamp values corresponding to the digital data stream segment and a clock signal from an independent source, and (2) a digital data stream correction circuit, responsive to the determined differential delay, outputting said digital data stream as a corrected data packet stream having time stamps identifying an expected interarrival time substantially coinciding with an actual time duration of the corresponding data packet stream segment of said corrected data packet stream, said corrected data packet stream being output for decompression to obtain information for use by a subscriber.

27. A receiver as recited in claim 26, further comprising a digital entertainment terminal (DET) comprising:

a program selection circuit for outputting said selected identifier value in response to a user input;

a clock recovery circuit, said clock recovery circuit being synchronized in accordance with said time stamps from said corrected data packet stream; and a decoder for decoding said information from said corrected data packet stream in response to timing signals from said clock recovery circuit.

28. A receiver as recited in claim 27, wherein said corrected data packet stream is in MPEG format.

29. A receiver as recited in claim 26, wherein said digital data stream correction circuit comprises a buffer circuit receiving said digital data stream for adjusting said actual time duration of each said corresponding data packet stream segment in accordance with said corresponding determined differential delay.

30. A receiver as recited in claim 29, wherein said buffer circuit has an output data rate controlled in response to said determined differential delay.

31. A receiver as recited in claim 29, wherein said buffer circuit selectively adjusts a spacing between packets in said digital data stream in accordance with said determined differential delay.

32. A receiver as recited in claim 29, wherein said buffer circuit adjusts said actual time duration in accordance with said corresponding determined differential delay and a buffer fullness ratio.

33. A receiver as recited in claim 29, wherein said digital data stream correction circuit further comprises a timing restamp module replacing said detected time stamp values with said time stamps identifying an expected interarrival time substantially coinciding with an actual time duration of said corresponding data packet stream segment.

34. A receiver as recited in claim 26, wherein said digital data stream correction circuit comprises a timing restamp module replacing said detected time stamp values with said time stamps identifying an expected interarrival time substantially coinciding with an actual time duration of said corresponding data packet stream segment.

35. A converter for converting a data stream of asynchronous transfer mode (ATM) cells carrying MPEG-encoded data into an MPEG-encoded packet stream, comprising:

an ATM stream selector for capturing a selected group of said ATM cells on the basis of a selected identifier value;

an ATM adaptation layer processor for recovering from said group of said ATM cells said MPEG-encoded packet stream carrying program clock reference (PCR) values, each pair of PCR values representing an expected interarrival time of a corresponding segment from said MPEG-encoded packet stream; and a cell delay variation correction circuit comprising:
(1) a segment delay detection circuit for determining a differential delay between said expected interarrival time of a corresponding segment and an actual interarrival time, said segment delay detection circuit calculating said actual interarrival time in response to a detection of a pair of PCR values corresponding to the digital data stream segment and a clock signal from an independent source, and
(2) a digital data stream correction circuit, responsive to the determined differential delay, outputting said MPEG-encoded packet stream as a corrected MPEG-encoded packet stream having PCR values identifying an expected interarrival time substantially coinciding with an actual time duration of the corresponding segment of said corrected MPEG-encoded packet stream, said corrected MPEG-encoded packet stream being output for further transmission on the broadband network.

36. A converter as recited in claim 35, wherein said digital data stream correction circuit comprises a buffer circuit, receiving said MPEG-encoded packet stream from said ATM adaptation layer processor, for adjusting said actual time duration in accordance with said corresponding determined differential delay.

37. A receiver as recited in claim 36, wherein said buffer circuit has an output data rate controlled in response to said determined differential delay.

38. An apparatus as recited in claim 36, wherein said buffer circuit selectively adjusts a spacing between packets in said MPEG-encoded packet stream in accordance with said determined differential delay.

39. An apparatus as recited in claim 36, wherein said buffer circuit adjusts said actual time duration in accordance with said corresponding determined differential delay and a buffer fullness ratio.

40. An apparatus as recited in claim 36, wherein said digital data stream correction circuit further comprises a timing restamp module replacing said detected PCR values with said PCR values identifying an expected interarrival time substantially coinciding with said actual time duration of said corrected MPEG-encoded packet stream.

41. An apparatus as recited in claim 35, wherein said digital data stream correction circuit comprises a timing restamp module replacing said detected PCR values with said PCR values identifying an expected interarrival time substantially coinciding with said actual time duration of said corrected MPEG-encoded packet stream.

42. A digital entertainment terminal (DET) for receiving an MPEG-encoded packet stream after transport via an asynchronous transfer mode (ATM) network, comprising:

an MPEG stream alignment circuit receiving the transported MPEG-encoded packet stream and outputting an aligned MPEG stream;

a clock synchronization circuit for outputting a clock pulse in accordance with PCR values of said aligned MPEG stream; and an MPEG decoder for selecting at least one MPEG stream by its PID value and for decoding said aligned MPEG stream in accordance with the clock pulse;

in which said MPEG stream alignment circuit comprises:
a time stamp detector for detecting PCR values located within said transported MPEG-encoded packet stream, each pair of time stamps representing an expected interarrival time of a corresponding data packet stream segment;
a timing circuit, responsive to an independent clock signal, for determining an actual interarrival time for each said corresponding data packet stream segment;
a detecting circuit for detecting jitter in said data packet stream between each data packet stream segment on the basis of said corresponding expected interarrival time and said corresponding actual interarrival time; and
a data packet stream correction circuit, responsive to the detected jitter, outputting said aligned MPEG stream as a corrected data packet stream having PCR values identifying an expected interarrival time substantially coinciding with an actual time duration of the corresponding data packet stream segment of said corrected data packet stream.

43. A terminal as recited in claim 42, wherein said data packet stream correction circuit comprises a buffer circuit receiving said transported MPEG-encoded packet stream for adjusting said actual time duration of each said corresponding data packet stream segment in accordance with said corresponding detected jitter.

44. A terminal as recited in claim 43, wherein said buffer circuit has an output data rate controlled in response to said detected jitter.

45. A terminal as recited in claim 43, wherein said buffer circuit selectively adjusts a spacing between packets in said transported MPEG-encoded packet stream in accordance with said detected jitter.

46. A terminal as recited in claim 43, wherein said buffer circuit adjusts said time duration in accordance with said corresponding detected jitter and a buffer fullness ratio.

47. A terminal as recited in claim 43, wherein said data packet stream correction circuit further comprises a timing restamp module replacing said PCR values in said transported MPEG-encoded packet stream with corrected PCR values in accordance with said detected jitter.

48. A terminal as recited in claim 42, wherein said data packet stream correction circuit comprises a timing restamp module replacing said PCR values in said transported MPEG-encoded packet stream with corrected PCR values in accordance with said detected jitter.

49. A method for recovering timing in a coded data transport stream having jitter caused by delays generated during network transport, comprising the steps of:

receiving an independent clock signal;

detecting time stamp values from said coded data transport stream expected to be at substantially regular interval portions, each time stamp value identifying an expected arrival time of a corresponding interval portion of said coded data transport stream;

identifying an actual arrival time for each said time stamp value in accordance with said independent clock signal;

determining an expected differential time on the basis of time stamp values;

determining an actual differential time on the basis of actual arrival times;

calculating jitter based on a difference between said expected differential time and said corresponding actual differential time; and correcting said coded data transport stream in response to the calculated jitter to have time stamp values identifying an expected interarrival time that substantially coincides with an actual time duration of the corresponding segment of the corrected coded data transport stream.

50. A method as recited in claim 49, wherein said coded data transport stream is MPEG-encoded data and said time stamp values are PCR values.

51. A method as recited in claim 49, wherein said correcting step comprises the steps of:

supplying said coded data transport stream to a buffer circuit; and adjusting said actual time duration in said buffer circuit in accordance with said jitter.

52. A method as recited in claim 51, wherein said adjusting step comprises the step of varying an output data rate of said buffer circuit in response to said jitter.

53. A method as recited in claim 51, wherein said adjusting step comprises the step of selectively adjusting in said buffer circuit a spacing between packets in said coded data transport stream in accordance with said jitter.

54. A method as recited in claim 51, wherein said adjusting step comprises the step of adjusting said actual time duration in said buffer circuit in accordance with said corresponding determined jitter and a buffer fullness ratio.

55. A method as recited in claim 51, wherein said adjusting step comprises the step of replacing said detected time stamp values with said time stamp values identifying an expected interarrival time substantially coinciding with said actual time duration of said corrected coded data transport stream.

56. A method as recited in claim 49, wherein said adjusting step comprises the step of replacing said detected time stamp values with said time stamp values identifying an expected interarrival time substantially coinciding with said actual time duration of said corrected coded data transport stream.

57. A method comprising:

detecting a first time stamp value at the beginning of a segment in a digital data transport stream subjected to differential delays;

in response to the first time stamp value, recording a first actual arrival time value;

detecting a second time stamp value in said digital data transport stream;

in response to the second time stamp value, recording a second actual arrival time value;

subtracting the first time stamp value from the second time stamp value to determine an expected arrival interval for the segment;

subtracting the first actual arrival time from the second actual arrival time to determine an actual arrival interval for the segment;

measuring a differential delay imposed on the segment by calculating a difference between the actual arrival interval and the actual arrival interval;

processing the segment to compensate for the measured differential delay imposed on the segment; and decoding the processed segment at a clock rate synchronized by time stamp values contained in the segment.

* * * * *